United States Patent [19]
Csontos

[11] 3,862,975
[45] Jan. 28, 1975

[54] PROCESS FOR PREPARING LIQUID XANTHATE-TERMINATED POLYMERS

[75] Inventor: Alan A. Csontos, Norton, Ohio

[73] Assignee: The B. F. Goodrich Company, New York, N.Y.

[22] Filed: July 31, 1973

[21] Appl. No.: 384,208

[52] U.S. Cl. .............................. 260/455 R, 260/79
[51] Int. Cl. ......................................... C07c 154/02
[58] Field of Search .......................... 260/455 B, 79

[56] References Cited
UNITED STATES PATENTS

| | | | |
|---|---|---|---|
| 1,634,924 | 7/1927 | Whitby | 260/455 B |
| 2,103,140 | 12/1937 | Bishop | 260/455 B |
| 2,163,956 | 6/1939 | Moeller | 260/455 B |
| 2,307,307 | 1/1943 | Shoemaker | 260/455 B |
| 2,307,679 | 1/1943 | Hechenbleikner | 260/455 B |
| 2,547,150 | 4/1951 | Blake et al. | 260/455 B |
| 3,047,544 | 7/1962 | Byrd | 260/79 |
| 3,409,527 | 11/1968 | Lefevre et al. | 260/455 B |
| 3,449,301 | 6/1969 | Noll et al. | 260/79 |
| 3,580,830 | 5/1971 | Siebert | 260/79 |

Primary Examiner—Lewis Gotts
Assistant Examiner—D. R. Phillips
Attorney, Agent, or Firm—J. Hughes Powell, Jr.

[57] ABSTRACT

Liquid xanthate-terminated polymers are prepared in an improved process comprising polymerizing a vinyl monomer(s) having at least partial solubility in water with, optionally, a vinyl monomer having little or no solubility in water, using a persulfate catalyst as the free-radical initiator and conducting the polymerization in aqueous media in the presence of a dixanthogen disulfide compound and a small amount of an emulsifying agent. The liquid polymer can be isolated from the resultant latex by direct drying. The xanthate-terminated polymers are readily hydrolyzed or pyrolyzed to yield liquid mercaptan-terminated polymers which are useful to prepare caulks, casted and molded articles, potting compounds, and the like.

8 Claims, No Drawings

PROCESS FOR PREPARING LIQUID XANTHATE-TERMINATED POLYMERS

BACKGROUND OF THE INVENTION

The process of this invention is particularly directed to solving rather unique problems associated with the preparation of liquid mercaptan-terminated polymers from liquid xanthate-terminated polymers. Although both solution (U.S. Pat. No. 3,580,830) and emulsion (U.S. Pat. Nos. 3,047,544 and 3,449,301) polymerization techniques can be used to prepare liquid xanthate-terminated polymers, the emulsion technique is preferred in present large-scale production. Again, although both hydrolysis (U.S. Pat. No. 3,047,544) and pyrolysis (U.S. Pat. No. 3,449,301) techniques can be used to react the xanthate-terminated polymers to yield the mercaptan polymers, the pyrolysis technique is preferred in that it is faster, involves less steps and materials, and yields a tighter curing mercaptan product. Hence, a preferred mercaptan polymer process is that disclosed in U.S. Pat. No. 3,449,301; i.e., a combination of emulsion polymerization and subsequent pyrolysis. Unfortunately, this process is handicapped with a solvent coagulation method that is costly in materials, labor, and equipment.

Of the standard coagulation methods, i.e., use of mono-, di-, and polyvalent metal salts, acid pHing, use of solvents, freeze-agglomeration, and the like, only the use of polyvalent metal salts or the use of solvents will efficiently coagulate latexes prepared in accordance with the above-identified emulsion polymerization patents. However, the pressence of polyvalent metal salts in recovered xanthate-terminated polymer is extremely detrimental to mercaptan polymers prepared via pyrolysis, resulting in a high cross-linked, gelled product. This leaves the use of solvents for coagulation. Simply drying down the prior art latexes to isolate the polymers is not satisfactory as this leaves behind large amounts of emulsifying agents, catalyst residues, and the like in the liquid polymer. These ingredients detract from appearance, result in increased gelling and cross-linking of the polymer during pyrolysis, and result in poorer adhesion of the mercaptan-terminated product.

SUMMARY OF THE INVENTION

Liquid xanthate-terminated polymers are prepared in an improved process comprising polymerizing a monomer(s) having at least partial solubility in water with, optionally, a vinyl monomer having little or no solubility in water, using a persulfate catalyst as the free-radical initiator and conducting the polymerization in an aqueous media and in the presence of a dixanthogen disulfide compound and a small amount of an anionic or non-ionic emulsifying agent. The polymerization is fast, goes to high conversion, and results in a stable latex which can be directly dried down to isolate the polymer. The liquid xanthate-terminated polymers are readily hydrolyzed or pyrolyzed to yield relatively uncrosslinked liquid mercaptanterminated polymers.

DETAILED DESCRIPTION

The liquid xanthate-terminated polymer is prepared using an improved emulsion polymerization technique. Distinct features of this technique are (1) the use of very low levels of emulsifying agent, (2) the use of at least one monomer having at least partial solubility in water, (3) the use of a dixanthogen disulfide compound, and (4) the use of a persulfate catalyst as the polymerization initiator.

The emulsifying agent can be any anionic or nonionic emulsifying agent, either natural or synthetic, capable of forming emulsions. More preferredly, the agent is an anionic emulsifying agent. Examples of the agents are disproportionated tall oil rosin, potassium and soidum salts of high molecular weight fatty acids such as sodium salt of hydrogenated tallow fatty acid, alkyl phenoxy poly(ethyleneoxy)ethanols such as nonylphenoxy poly(ethyleneoxy)ethanol, potassium and sodium salt of organic phosphate ester, sodium di-octyl sulfosuccinate, sodium alkyl sulfates such as sodium lauryl sulfate, and sodium alkylaryl sulfonates such as sodium dodecylbenzene sulfonate.

The emulsifying agent is used at a level from about 0.05 part to about 0.5 part by weight based on 100 parts by weight of the monomer(s). Use of over 0.5 part by weight of emulsifying agent is not necessary to obtain the improvements of this invention. A level of from about 0.10 part to about 0.3. part by weight provides excellent results.

A partially water soluble monomer must be employed. This monomer is a vinyl monomer having a terminal vinylidene

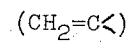

group and having a solubility in water of at least about 0.2 part by weight in 100 parts by weight of water at 10°C. The monomers often have polar groups thereon, i.e., carboxylic acid groups, ester groups, amine and amide groups, and the like. Examples of the monomers are acrylic acid, methacrylic acid, methyl acrylate, ethyl acrylate, butyl acrylate, vinyl acetate, allyl acetate, vinyl chloride, acrylonitrile, acrylamide, allyl amine, allyl alcohol, vinyl ethyl ether, diallyl ether, ethylene, and the like. Monomers having very high or unlimited solubility in water like acrylic acid, acrylamide and allyl alcohol, are not preferred.

These monomers can be polymerized alone, in mixture with each other, or in mixture with water insoluble monomer; i.e., a monomer having little or no solubility in water. The latter monomers are vinyl monomers having terminal vinylidene

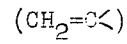

groups and having a solubility in water of less than 0.2 part per 100 parts by weight of water at 10°C. The monomers are often hydrocarbon monomers having four or more carbon atoms in the molecule. Examples of the monomers are butadiene, isoprene, chloroprene, 1,5-hexadiene, dicyclopentadiene, ethylidene norbornene, styrene, α-methyl styrene, chlorostyrene, vinyl bromide, allyl acetate, 2-ethylhexyl acrylate, decyl acrylate, butylene, and the like. Copolymers of a partially water soluble monomers(s) and a water insoluble monomer(s) (i.e., having little or no water solubility) are readily prepared via this process.

When a mixture of a partially water soluble monomer(s) and a water insoluble monomer(s) is employed, the partially water soluble monomer is used at from about 2 parts to about 99 parts by weight and the water insoluble monomer at about 1 part to about 98 parts by weight based on 100 parts by weight of the total monomer. More preferredly, the partially water soluble monomer is used at from about 5 parts to about 50 parts by weight, and even more preferredly at about 10 parts to about 40 parts by weight. Excellent results are obtained when using from about 10 parts to about 40 parts by weight of acrylonitrile with about 60 parts to about 90 parts by weight of a diene monomer such as butadiene or isoprene.

Examples of liquid xanthate-terminated polymers that can be prepared using the emulsion polymerization technique of this invention are xanthate-terminated: poly(ethyl acrylate), poly(butyl acrylate), poly(vinyl acetate), poly(vinyl ethyl ether), poly(methyl acrylate/ethyl acrylate), poly(methyl acrylate/butyl acrylate), poly(ethyl acrylate/vinyl acetate), poly(ethyl acrylate/acrylic acid), poly(ethyl acrylate/acrylamide), poly(ethyl acrylate/allyl alcohol), poly(ethyl acrylate/ethylene), poly(butyl acrylate/vinyl chloride), poly(butyl acrylate/acrylonitrile), poly(vinyl ethyl ether/methacrylonitrile), poly(vinyl ethyl ether/diallyl ether), poly(methyl acrylate/ butadiene), poly(methyl acrylate/2-ethylhexyl acrylate), poly (ethyl acrylate/butadiene), poly(ethyl acrylate/isoprene), poly(ethyl acrylate/styrene), poly(ethyl acrylate/vinyl bromide), poly(ethyl acrylate/chlorostyrene), poly(ethyl acrylate/ butylene), poly(ethyl acrylate/2-ethylhexyl acrylate), poly (ethyl acrylate/butyl acrylate/2-ethylhexyl acrylate), poly (ethyl acrylate/acrylic acid/butadiene), poly(ethyl acrylate/ styrene/butadiene), poly(butyl acrylate/acrylonitrile), poly (butyl acrylate/styrene/isoprene), poly(butyl acrylate/dicyclopentadiene), poly(vinyl acetate/isoprene), poly(vinyl acetate/ chloroprene), poly(vinyl acetate/1,5-hexadiene), poly(acrylonitrilel/butadiene), poly(acrylonitrile/isoprene), poly(acrylonitrile/butylene), poly(acrylonitrile/acrylic acid/butadiene), poly(methacrylonitrile/butadiene), poly(acrylamide/isoprene), poly(acrylamide/2-ethylhexyl acrylate), poly(vinyl ethyl ether/ α-methyl styrene), poly(vinylethyl ether/vinyl bromide), poly (allyl alcohol/chloroprene), poly(allyl alcohol/ethyl acrylate/ styrene), and the like.

The dixanthogen disulfide compounds used have the formula

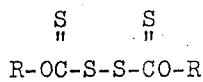

where R is an alkyl radical containing one to about 12 carbon atoms, an aryl or aralkyl radical containing six to about 12 carbon atoms, or a cycloalkyl radical containing four to eight carbon atoms in the ring. These hydrocarbon radicals can be substituted. Examples of the compounds are dimethyl dixanthogen disulfide, diethyl dixanthogen disulfide, dipropyldixanthogen disulfide, diisopropyl dixanthogen disulfide, dibutyl dixanthogen disulfide, di-sec-butyl dixanthogen disulfide, dihexyl dixanthogen disulfide, dioctyl dixanthogen disulfide, didecyl dixanthogen disulfide, diphenyl dixanthogen disulfide, di(4-hexylphenyl)dixanthogen disulfide, dibenzyl dixanthogen disulfide, dinaphthyl dixanthogen disulfide, dicyclobutyl dixanthogen disulfide, dicyclohexyl dixanthogen disulfide, and the like.

More preferredly, the R radical is an alkyl radical containing 1 to about 8 carbon atoms or a phenyl, benzyl, or cyclohexyl radical. If the pyrolysis technique is to be employed to react the xanthate-terminated polymer, the R radical should be an alkyl radical containing three to six carbon atoms. The dixanthogen disulfide compound is used at a level from about 2 parts to about 20 parts by weight per 100 parts by weight of the monomer(s), (s), and more preferredly at from about 6 parts to about 16 parts by weight.

The persulfate catalyst employed has the formula $$M_zS_2O_8$$

where M is selected from the group of ions consisting of $NH_4$, Na, K, Pb, and Ba, and z is 1 or 2 depending on the valence of the ion. More preferredly, the persulfate is selected from ammonium persulfate, potassium persulfate, and sodium persulfate. The persulfate catalyst is used in a range from about 0.1 part to about 0.8 part by weight per 100 parts by weight of monomer. Use of over 0.8 part by weight is not necessary to obtain the improvement of this invention. Excellent results are obtained using the persulfate catalyst at from about 0.2 part to about 0.6 part by weight.

The water, emulsifying agent, monomer(s), dixanthogen disulfide, and persulfate catalyst can all be charged to a reactor vessel and the polymerization run as a batch process, or one or more ingredients can be proportioned in or added in increments during polymerization following well known techniques. It is preferred to add the dixanthogen disulfide dissolved in monomer, a solvent therefore, or as a suspension in water using some of the emulsifier. Standard charging techniques are used. Agitation during polymerization aids the dispersion. Temperature of reaction is from about 50°C. to about 100°C., with a temperature of about 60°C. to about 80°C. providing excellent results. Conversion of monomers to polymer is normally above 50 percent in 4 to 6 hours.

The polymerization can be stopped using any of the well known polymerization shortstops such as 2,5-di-(t-amyl) hydroquinone, diethyl hydroxyamine, sodium dimethyl dithiocarbamate, and the like. The use of 2,4-di-(t-amyl)hydroquinone not only shortstops the reaction but can remain with the polymer providing a degree of oxidative protection.

The polymerization mixture is a milky stable latex. The particle size of the latex is small, with usually more than 90 percent of the particles having a particle size under 1.9 μ (as measured using a Coulter Counter).

The liquid xanthate-terminated polymer can be isolated from the latex by directly drying down the latex. Drying can be conducted at from about 60°C. under a vacuum to about 100°C. or more. Drying down of the latex at about 90°C. under 10 to 25 inches of Mercury vacuum is very effective. If foaming is a problem, addition of about 0.1 percent by weight of phosphoric acid or of known defoaming agents can be used. Although the latex can be dried down in an agitated vessel under vacuum, thin film evaporators and driers can dry the latex and polymer very well. Examples of these evaporators and driers are Rodney Hunt thin film evaporators, PIECO driers, and the like.

Very little residue is left in the polymer. For example, a typical recipe consists of 100 parts of monomer, 120 parts of water, 12 parts of dixanthogen disulfide, 0.3 part of persulfate catalyst, and 0.15 part of emulsifying agent. Water and unreacted monomer is evaporated off. At 60 percent conversion of monomers to polymer (including all of the dixanthogen disulfide which is totally incorporated into the polymer by 60 percent conversion), the total soap and catalyst residues amount to less than 0.7 percent by weight of the polymer. In contrast, if the latex emulsion recipes employed in U.S. Pat. Nos. 3,047,544 and 3,449,301 were used, and the latex directly dried down, soap, catalyst and other residues would amount to (at 60 percent conversion) but 8 percent by weight of the polymer. Additionally, the latex prepared following this invention can be coagulated using a solution of sodium chloride in water. The prior art latexes could not be coagulated using monovalent metal salts. However, the use of any metal salt as a coagulant results in some of the salt remaining with the polymer. Therefore, direct drying is preferred.

The xanthate-terminated polymers have polymeric backbones consisting of carbon-carbon linkages. The polymers have a molecular weight of from about 1000 to about 12,000 (as measured using a Mecrolab Vapor Pressure Osmometer). More preferredly, the polymers are described by their bulk viscosity. The polymers have a bulk viscosity of from about 500 centipoise to as high as 8,000,000 centipoise (measured at 27°C. using a Brookfield Model LVT Viscometer, and using spindle No. 7 at 0.5 to 100 rpm). Preferredly, the polymers have bulk viscosities of from about 5,000 centipoise to about 1,000,000 centipoise. A bulk viscosity of from about 20,000 centipoise to about 400,000 centipoise is readily used in many applications. The xanthate content of the polymer (determined by measuring the sulfur content of the polymer) is from about 4 percent to about 20 percent by weight based on the total weight of the polymer.

The liquid xanthate-terminated polymers can be hydrolyzed or pyrolyzed to yield liquid mercaptan-terminated polymers. The hydrolysis technique, disclosed in U.S. Pat. No. 3,047,544, employs alcoholic KOH or a secondary amine to form the mercaptan groups. Since this technique takes a long time and also requires the use of additional materials and steps, the pyrolysis technique disclosed in U.S. Pat. No. 3,449,301 is preferred. Using this technique, the bulk polymer is heated to above 120°C. under a vacuum until the desired conversion takes place. Although this technique is preferred, it is very sensitive to the presence of metal salts. For example, use of alum, $Al_2(SO_4)_3$ to coagulate a prior art latex results in a fast, efficient coagulation. However, the metal salt residue does not easily wash out with water, nor is the use of a metal chelate in the wash water satisfactory. Liquid xanthate-terminated polymer containing the aluminum metal salt residue gels and crosslinks during pyrolysis, resulting in an unuseable polymer. The latex prepared following the process of this invention can be directly dried down. The isolated polymer can be pyrolyzed without harmful effects to the liquid mercaptan-terminated polymer.

The prepared mercaptan-terminated polymers have a mercaptan content of from about 0.5 percent to about 8 percent by weight based upon the weight of the polymer (as measured using iodine oxidation). Bulk viscosity and molecular weight are in the range specified for the liquid xanthate-terminated polymer. Polymerized monomer content is similar for both polymers. If other compounds would be used in place of the dixanthogen disulfides, the weight percent of compound fragment in the terminal position, bulk viscosity of the polymer, etc., are all similar to that disclosed above.

Curatives for the liquid mercaptan-terminated polymers include lead and zinc peroxide, aromatic and aliphatic polyepoxides with or without amine catalysts, polyisocyanates, and polyunsaturated materials such as di- and triacrylates.

Although the disclosure is particularly directed to the use of dixanthogen disulfide compounds to prepare xanthate-terminated polymers, other chain modifiers can be employed in the polymerization process. Examples of these compounds are tertiary octyl mercaptan, tertiary dodecyl mercaptan, n-tridecyl mercaptan, n-hexadecyl mercaptan, and the like. Also, dicarboxyl disulfides such as dithiobutyric acid, dithiopropionic acid, dithiopentanoic acid, dithiosalicylic acid, dithioglycoholic acid, bis(4-carboxyphenyl)disulfide, and the like, can be employed to yield carboxyl-terminated polymers. Similarly, compounds such as bis($\alpha$-hydroxyethyl)disulfide and bis (4-hydroxymethylphenyl)disulfide can be employed to yield hydroxyl-terminated polymers, and carbon tetrachloride, bromotrichloromethane, and the like, to yield halogen-terminated polymers. When another compound is used in place of the dixanthogen disulfide compound, it is used at levels of from about 2 to about 20 parts per 100 parts of monomer.

The following Examples serve to more fully illustrate the invention.

EXAMPLES

Two series of control experiments were run to demonstrate the preparation and coagulation of a xanthate-terminated polymer latex prepared following well known emulsion polymerization techniques. The controls serve to demonstrate problems which are solved by the process of this invention.

Control 1

A liquid xanthate-terminated polymer was prepared using a standard emulsion polymerization recipe similar to those described in U.S. Pat. Nos. 3,449,301 and 3,047,544. The recipe used (in parts by weight) is as follows:

| | |
|---|---|
| Water | 180 |
| Sodium salt of dodecylbenzene sulfonic acid | 4.0 |
| Sodium salt of naphthalene sulfonic acid | 0.5 |
| $Na_2CO_3$ | 0.2 |
| $Na_2S_2O_4$ | 0.02 |
| Butadiene | 80 |
| Acrylonitrile | 20 |
| Diisopropyl xanthogen disulfide | 13 |
| Sodium ferric ethylenediamine tetraacetate | 0.02 |
| Sodium formaldehyde sulfoxalate | 0.5 |
| Sodium salt of ethylenediamine tetraacetic acid | 0.2 |
| Diisopropylbenzene hydroperoxide | 0.6 |

The polymerization was run at 25°C. After 14 hours, the polymerization was shortstopped by adding 2.0 parts by weight of 2,4-di(t-amyl)hydroquinone. Percent conversion of monomers to polymer was 60 percent. Total solids of the latex was 29.4 percent by weight. The latex was adjusted to pH of 6 using phosphoric acid. Samples of the latex were coagulated using various coagulants.

A. Solvent coagulation using isopropyl alcohol. 1.0 gallon of latex was placed in a mixing kettle. 1.5 gallon of isopropyl alcohol was added and the mixture stirred for 15 minutes, followed by a one-hour settling time. The polymer phase was separated out and washed with 1.0 gallon of water, again using a 15 minute agitation and a 1 hour settling time. The polymer phase was separated out and dried down under vacuum to recover the polymer. Good separations occurred upon both coagulation and washing. Over 80 percent by weight of the polymer in the latex was recovered. The isopropyl alcohol coagulation serum (about 2 gallons) was scrapped out.

B. Metal salt coagulation using magnesium sulfate, $MgSO_4$. Following the procedure given in (A) above, a 1 percent by weight solution of magnesium sulfate in water was added to the latex. After mixing, no separation occurred. Additional $MgSO_4$ was added (making the $MgSO_4$ solution 2 percent by weight) and the mixing and settling repeated. Still no separation occurred. A further attempt at 3 percent by weight of $MgSO_4$ also resulted in no separation. An attempt to coagulate a gallon of the latex by first adjusting the pH of the latex to 3 by adding $H_3PO_4$, followed by the addition of 1.5 gallons of 3 percent by weight of $MgSO_4$ in water to the latex resulted in no separation.

C. Metal salt coagulation using aluminum sulfate, $Al_2(SO_4)_3$. Following the procedure given in (A) above 3 gallons of a solution of 1 percent by weight $Al_2(SO_4)_3$ in water was added to 2 gallons of latex. Good separation occurred after mixing. The polymer phase was separated and divided into two equal portions. The first portion was washed using 1 gallon of water. The second portion, identified as (D), was washed using 1 gallon of a solution of 7 percent by weight citric acid in water. Both portions separated out well. Polymer recovery in each portion was over 90 percent by weight of the polymer in the latex.

The liquid xanthate-terminated polymers recovered in samples (A), (C), and (D) were pyrolyzed following the procedure described in U.S. Pat. No. 3,449,301. Conditions were heating at 180°C. for 40 minutes. Sample (A) yielded a clear, light brown mercaptan-terminated polymer having a bulk viscosity at 27°C. of 34,000 centipoise and containing no visible gel. Sample (C) never did heat up to 180°C. as it gelled at about 140°C. Sample (D) yielded a dark brown polymer having a bulk viscosity of over 8,000,000 centipoise at 27°C. and containing visible gelled material.

Efforts to coagulate the latex using a 1 percent by weight solution of $CaCl_2$ in water, a 10 percent by weight solution of NaCl in water, and by freeze-agglomeration, were not successful. In each case, no separation occurred.

Control 2

This series of experiments shows that a solution does not lie in simply using less emulsifying agent. The following polymerizations were run:

| Ingredient | 1 | 2 | 3 | 4 | 5 | 6 | 7 | 8 | 9 |
|---|---|---|---|---|---|---|---|---|---|
| Water | 150 | 150 | 150 | 150 | 150 | 150 | 150 | 150 | 150 |
| Sodium salt of dodecylbenzene sulfonic acid | 4 | 2 | 0.25 | 0.25 | — | 0.25 | — | — | — |
| Potassium salt of fatty acids | — | — | — | — | — | — | 4 | 2 | 0.25 |
| Sodium salt of naphthalene sulfonic acid | 0.5 | 0.5 | 0.5 | 1.0 | 1.0 | — | 0.5 | 0.5 | 1.0 |
| $Na_2CO_3$ | 0.2 | 0.2 | 0.2 | 0.2 | 0.2 | 0.2 | 0.2 | 0.2 | 0.2 |
| Butadiene | 80 | 80 | 80 | 80 | 80 | 80 | 80 | 80 | 80 |
| Acrylonitrile | 20 | 20 | 20 | 20 | 20 | 20 | 20 | 20 | 20 |
| Diisopropyl xanthogen disulfide[a] | 12 | 12 | 12 | 12 | 12 | 12 | 12 | 12 | 12 |
| Benzene | 12 | 12 | 12 | 12 | 12 | 12 | 12 | 12 | 12 |
| Sodium ferric ethylenediamine tetraacetate | 0.02 | 0.02 | 0.02 | 0.02 | 0.02 | 0.02 | 0.02 | 0.02 | 0.02 |
| Sodium formaldehyde sulfoxalate | 0.5 | 0.5 | 0.5 | 0.5 | 0.5 | 0.5 | 0.5 | 0.5 | 0.5 |
| Sodium salt of ethylenediamine tetraacetic acid | 0.2 | 0.2 | 0.2 | 0.2 | 0.2 | 0.2 | 0.2 | 0.2 | 0.2 |
| Diisopropylbenzene hydroperoxide | 0.5 | 0.5 | 0.5 | 0.5 | 0.5 | 0.5 | 1.0 | 1.0 | 1.0 |
| 8 hours at 30°C., shortstopped with 2.0 parts of 2,4-di(t-amyl) hydroquinone | | | | | | | | | |
| Percent total solids | 23 | 19 | 7 | 9 | 8 | 8 | 35 | 29 | 14 |
| Percent conversion | 55 | 43 | 15 | 20 | 16 | 17 | 87 | 72 | 34 |
| Rate of polymerization, %/hour | 6.9 | 5.4 | 1.9 | 2.5 | 2.0 | 2.1 | 10.9 | 9.0 | 4.2 |

[a] The dixanthogen was added as a 50% by weight solution in benzene

The data shows that final conversion and polymerization rate decreased drastically as the level of emulsifying agent used was decreased.

EXAMPLE I

A series of polymerizations were run using the process of this invention. The recipes are (in parts by weight):

| | 1 | 2 | 3 | 4 |
|---|---|---|---|---|
| Water | 100 | 100 | 100 | 100 |
| Sodium salt of dodecyl benzene sulfonic acid | 0.25 | 0.25 | 0.1 | — |
| Butadiene | 80 | 80 | 80 | 80 |
| Acrylonitrile | 20 | 20 | 20 | 20 |
| Diisopropyl xanthogen disulfide | 13 | 13 | 13 | 13 |
| Potassium persulfate | 0.3 | — | — | — |
| Ammonium persulfate | — | 0.3 | 0.3 | 0.3 |
| 6 hours at 70°C. | | | | |
| Percent conversion | 69 | 77 | 64 | 24 |
| Polymerization rate percent/hour | 11.5 | 12.8 | 10.7 | 4.0 |
| Polymer viscosity cps at 27°C. | 31,000 | 30,400 | 21,800 | 1,400 |

After 6.0 hours, the polymerizations were shortstopped by adding 2 parts by weight of 2,4-di(t-amyl)hydroquinone. The polymers were isolated by directly drying down the latex at 90°C. under a vacuum. The Example shows that a fast polymerization rate, high conversion, and good quality polymer is prepared, even at levels of soap down to 0.1 part. Sample 4, employing no soap, demonstrates that to obtain a fast polymerization rate and high conversion, a small amount of emulsifying agent is required.

EXAMPLE II

Liquid xanthate-terminated poly(butadiene-acrylonitrile) polymers were prepared. The recipes in parts by weight are:

| Sample | 2 | 3 | 4 |
|---|---|---|---|
| Percent mercaptan | 2.96 | 3.06 | 3.23 |
| Percent acrylonitrile | 20.0 | 19.9 | 26.5 |
| Percent butadiene | 67.0 | 67.0 | 70.3 |
| Viscosity, cps at 27°C. | 33,000 | 26,000 | 24,000 |

|  | 1 | 2 | 3 | 4 | 5 | 6 |
|---|---|---|---|---|---|---|
| Water | 125 | 125 | 125 | 125 | 125 | 125 |
| Sodium salt of dodecylbenzene sulfonic acid | 0.25 | 0.15 | 0.10 | 0.15 | 0.10 | — |
| Butadiene | 80 | 80 | 80 | 80 | 80 | 80 |
| Acrylonitrile | 20 | 20 | 20 | 20 | 20 | 20 |
| Diisopropyl xanthogen disulfide | 13 | 13 | 13 | 13 | 13 | 13 |
| Ammonium persulfate | 0.3 | 0.3 | 0.3 | — | — | 0.5 |
| Potassium persulfate | — | — | — | 0.3 | 0.3 | — |
| 6 hours at 70°C. |  |  |  |  |  |  |
| Percent Conversion | 65 | 61 | 56 | 50 | 44 | 13 |
| Polymerization rate, percent/hour | 10.8 | 10.1 | 9.4 | 8.3 | 7.3 | 2.1 |

The samples were shortstopped after 6 hours by adding 2 parts by weight of 2,4-di(t-amyl)hydroquinone. Sample 6 shows that a small amount of emulsifier is needed to obtain fast polymerization rates and high conversion. Samples 1 to 5 were directly dried down and the polymers recovered and analyzed. Properties were as follows:

|  | 1 | 2 | 3 | 4 | 5 |
|---|---|---|---|---|---|
| Percent xanthate content[a] | 13.6 | 15.2 | 16.1 | 17.9 | 12.5 |
| Percent acrylonitrile content[b] | 18.0 | 18.5 | — | 18.5 | 26.2 |
| Percent butadiene content[c] | 68.4 | 66.3 | — | 63.6 | 61.3 |
| Viscosity, cps. at 27°C. | 25,000 | 19,000 | 18,000 | 15,000 | 12,000 |

[a] Percent xanthate = percent sulfur × 270/128
[b] Percent acrylonitrile = percent nitrogen × 53/14
[c] Percent butadiene = 100% − (% xanthate + % VCN)

Excellent polymer was prepared in all of the samples. Percent sulfur was measured by burning a sample of the polymer in oxygen using an infrared lighter, collecting the residue in an acetone/water solution, adding bromophenol indicator to the solution and neutralizing with 0.02 normal NH$_4$OH, adding glacial acetic acid and dithizone indicator, and titrating to an end point using 0.02 molar lead nitrate in water. Percent nitrogen was measured using the Kjehldahl method for nitrogen.

EXAMPLE III

The liquid xanthate-terminated polymers prepared in Samples 2, 3 and 4 of Example II were pyrolyzed for 40 minutes at 180°C. The mercaptan-terminated polymers prepared are as follows:

Excellent liquid mercaptan-terminated poly(butadiene-acrylonitrile) polymers were prepared. The polymers were light brown colored with no visible sign of gelled material.

EXAMPLE IV

The liquid mercaptan-terminated polymers prepared in Example III were cured using an epoxy resin and an amine. All the vulcanizates had dry surfaces and rubbery properties. The recipes and data obtained are:

| Sample | 2 | 3 | 4 |
|---|---|---|---|
| Polymer | 100 | 100 | 100 |
| Diglycidyl ether of Bisphenol A | 24.4 | 25.2 | 26.5 |
| 2-ethylhexanoic acid salt of 2,4,6-tris(dimethylaminomethyl)phenol | 1.46 | 1.51 | 1.59 |
| 3 days at room temperature |  |  |  |
| Percent elongation | 500 | 400 | 550 |
| Hardness, durometer A | 25 | 20 | 12 |

EXAMPLE V

Polymerizations were made at various levels of water, soap, and persulfate catalyst (in addition to those already disclosed). The latexes were directly dried down and the resultant xanthate-terminated polymer pyrolyzed at 180°C. for 40 minutes. Polymerization recipes, latex data, xanthate and mercaptan polymer data is listed below.

|  | 1 | 2 | 3 | 4 | 5 | 6 | 7 | 8 |
|---|---|---|---|---|---|---|---|---|
| Water | 120 | 120 | 120 | 120 | 180 | 180 | 180 | 180 |
| Sodium salt of dodecylbenzene sulfonic acid | 0.15 | 0.15 | 0.30 | 0.30 | 0.15 | 0.15 | 0.30 | 0.30 |
| Butadiene | 80 | 80 | 80 | 80 | 80 | 80 | 80 | 80 |
| Acrylonitrile | 20 | 20 | 20 | 20 | 20 | 20 | 20 | 20 |
| Diisopropyl xanthogen disulfide | 12 | 12 | 12 | 12 | 12 | 12 | 12 | 12 |
| Na$_2$S$_2$O$_4$ | — | 0.02 | 0.02 | — | 0.02 | — | — | 0.02 |
| Ammonium persulfate | 0.3 | 0.6 | 0.3 | 0.6 | 0.3 | 0.6 | 0.3 | 0.6 |

—Continued

|  | 1 | 2 | 3 | 4 | 5 | 6 | 7 | 8 |
|---|---|---|---|---|---|---|---|---|
| Time, hours at 70°C. | 8 | 8 | 8 | 7 | 8 | 7 | 7 | 7 |
| Percent conversion | 80 | 77 | 66 | 87 | 78 | 90 | 82 | 83 |
| Latex, pH | 3.1 | 3.0 | 2.9 | 2.2 | 3.0 | 2.6 | 3.0 | 2.5 |
| Percent of latex particles over 1.9 $\mu$ | 6 | 3 | 2 | 12 | 3 | 7 | 3 | 1 |
| Xanthate polymer |  |  |  |  |  |  |  |  |
| Viscosity, cps at 27°C. | 38,200 | 31,600 | 28,400 | 41,400 | 37,000 | 41,400 | 34,200 | 33,600 |
| Mercaptan polymer |  |  |  |  |  |  |  |  |
| Viscosity, cps at 27°C. | 68,400 | 75,200 | 45,200 | 112,800 | 60,800 | 107,400 | 70,400 | 82,600 |
| Percent mercaptan | 2.2 | 2.0 | 2.7 | 2.0 | 2.1 | 1.8 | 1.9 | 1.8 |
| Percent acrylonitrile | 20.3 | 20.0 | 20.2 | 18.8 | 18.0 | 18.6 | 19.9 | 18.5 |
| Percent butadiene | 67.5 | 68.0 | 67.1 | 69.2 | 69.9 | 69.6 | 68.2 | 69.7 |

All of the samples produced good quality liquid xanthate-terminated and mercaptan-terminated polymer. All of the polymerizations reached high conversions and had fast polymerization rates. The final latex has an acid pH. Particle size of the latex particles is small, usually more than 90 percent of the latex particles having a diameter under 2 microns.

The mercaptan polymer data shows that the polymers made have quite uniform properties even though the amount of soap, water, and catalyst level were substantially varied. Higher viscosities and lower mercaptan contents are related to higher conversion of monomer to polymer. The use of higher or lower levels of dixanthogen disulfide compound yields lower or higher viscosities and higher or lower mercaptan values, respectively. Of course, use of higher or lower acrylonitrile monomer yields a higher or lower acrylonitrile content in the polymer. In total or partial replacement of the butadiene monomer, many other water insoluble monomers such as isoprene, chloroprene, styrene, chlorostyrene, 2-ethylhexyl acrylate, and the like, can be used. In total or partial replacement of the acrylonitrile monomer, monomers such as acrylic and methacrylic acid, ethyl acrylate, vinyl acetate, acrylamide, and the like, can be used.

The purity of the dixanthogen disulfide compound has an effect on the polymerization rate. For example, a sample of diisopropyl xanthogen disulfide which was used as received in recipes the same as those in the preceding table resulted in percent conversion rates of only 3 percent to about 7 percent per hour. A portion of the diisopropyl xanthogen disulfide was then dissolved in heptane at about 60°C. and precipitated out by cooling. The recrystalized (purified) compound, when used in the same recipes, demonstrated polymerization rates of from about 8 to 12 percent per hour. Dissolving the dixanthogen disulfide compound in a monomer and adding the monomer/disulfide solution into a reactor vessel through a filtering media such as filter cloth works well to remove inhibiting impurities that may be present.

Although the latexes resulting from using the procedure of this invention can be coagulated using methods not applicable to the prior art latexes, i.e., use of mono- and bi-valent metal salts as coagulants, simple drying down of the latex is still preferred. The use of any metal salt to coagulate the latex is detrimental to the quality and appearance of the xanthate and mercaptan product made, unless the metal salt is essentially completely removed from the polymer. Control I already showed the disastrous effects that $Al_2(SO_4)_3$ has upon the mercaptan product. The following experiment shows that even NaCl has detrimental effects on the polymer. The recipe used was: 180 parts water, 0.1 part of sodium salt of dodecyl benzene sulfonic acid, 80 parts butadiene, 20 parts acrylonitrile, 12 parts of diisopropyl xanthogen disulfide, and 0.3 part of ammonium persulfate. After 7 hours at 70°C., the polymerization was short-stopped by adding 2.0 parts of 2,4-di(t-amyl)hydroquinone. Percent conversion was 59 percent. About 900 grams of the latex was dried directly down. 15 drops of an anti-foam agent, tradename Nopco DD4, effectively inhibited excessive foaming during drying. The xanthate-terminated polymer was clear and light yellow in color, having a viscosity of 40,000 cps at 27°C. After pyrolysis at 180°C. for 40 minutes, the liquid mercaptan-terminated polymer was recovered and analyzed. The polymer had 2.25 percent mercaptan content and a viscosity of 142,000 cps.

A second 900 gram sample of the latex was coagulated using about 900 milliliters of a 10 percent by weight solution of NaCl in water. Good separation occurred. The polymer phase was separated out and dried to yield a cloudy, light yellow xanthate polymer having a viscosity of 45,000 cps. at 27°C. After pyrolysis at 180°C. for 40 minutes, the mercaptan-terminated product had a viscosity of 240,000 cps., and had a cloudy, brown appearance. Unless the metal salt is removed, the xanthate-terminated and mercaptan-terminated polymer has a poorer cloudy appearance and a significantly higher bulk viscosity.

I claim:

1. A process for preparing liquid xanthate-terminated polymers comprising polymerizing, at a temperature from about 50°C. to about 100°C., from about 2 parts to about 99 parts by weight of a partially water-soluble vinyl monomer(s) having a solubility in water of at least 0.2 part by weight in 100 parts by weight of water at 10°C. and selected from the group consisting of acrylic acid, methacrylic acid, methyl acrylate, ethyl acrylate, butyl acrylate, vinyl acetate, allyl acetate, vinyl chloride, acrylonitrile, acrylamide, allyl amine, allylalcohol, vinyl ethyl ether, diallyl ether, and ethylene with from about 1 part to about 98 parts by weight of a water insoluble vinyl monomer(s) having a solubility in water of less than 0.2 part by weight per 100 parts by weight of water at 10°C. selected from the group consisting of butadiene, isoprene, chloroprene, 1,5-hexadiene, dicyclopentadiene, ethylidene norbornene, styrene, α-methyl styrene, chlorostyrene, vinyl bromide, allyl acetone, 2-ethylhexyl acrylate, decyl acrylate, and butylene; using as a free radical catalyst a persulfate catalyst of the formula $$M_zS_2O_8$$

wherein M is selected from the group consisting of NH₄, Na, K, Pb, and Ba, and z is 1 or 2; and conducting the polymerization in aqueous media in the presence of from about 2 parts to about 20 parts by weight per 100 parts by weight of monomer of a dixanthogen disulfide compound of the formula

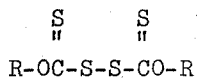

$$R-OC-S-S-CO-R$$

wherein R is selected from the group consisting of an alkyl radical containing one to about 12 carbon atoms, a cycloalkyl radical containing four to eight carbon atoms in the ring, and an aryl or aralkyl radical containing six to about 12 carbon atoms, and in the presence of from about 0.05 part to about 0.5 part by weight per 100 parts by weight of monomer of an anionic or nonionic emulsifying agent selected from the group consisting of disproportionated tall oil resin, potassium or sodium salt of high molecular weight fatty acids, alkylphenoxy poly(ethyleneoxy) ethanols, potassium or sodium salt of organic phosphate esters, sodium dioctyl sulfosuccinate, sodium alkyl sulfates, and sodium alkylaryl sulfonates.

2. A process of claim 1 wherein the emulsifying agent is an anionic emulsifying agent used at a level from about 0.1 part to about 0.3 part by weight based upon 100 parts by weight of monomer.

3. A process of claim 2 wherein the dixanthogen disulfide compound, R is an alkyl radical containing 3 to 6 carbon atoms, and said compound is used at from about 6 parts to about 16 parts by weight based upon 100 parts by weight of the monomer.

4. A process of claim 3 wherein the partially water-soluble monomer is acrylonitrile used at a level from about 10 parts to about 40 parts by weight and the water-insoluble monomer is butadiene or isoprene used at a level from about 60 parts to about 90 parts by weight, both based upon 100 parts by weight of total monomer.

5. A process of claim 4 wherein the dixanthogen disulfide compound is diisopropyldixanthogen disulfide.

6. A process of claim 5 wherein the emulsifying agent is a sodium alkylaryl sulfonate.

7. A process of claim 6 wherein the persulfate catalyst is ammonium persulfate.

8. A process of claim 6 wherein the persulfate catalyst is potassium persulfate.

* * * * *

UNITED STATES PATENT OFFICE
CERTIFICATE OF CORRECTION

PATENT NO. : 3,862,975
DATED : January 28, 1975
INVENTOR(S) : Alan A. Csontos

It is certified that error appears in the above-identified patent and that said Letters Patent are hereby corrected as shown below:

Column 1, line 32, "pressence" should read --presence--; line 35, "high" should read --highly--. Column 2, line 7, "soidum" should read --sodium--. Column 3, line 33, "crylonitrilel" should read --crylonitrile--. Column 5, line 4, "but" should read --about--. In the Table extending over Columns 7 and 8, under the number 7, "41" should be --4--. Column 11, line 49, "lyed" should read --lved--.

Signed and Sealed this thirteenth Day of April 1976

[SEAL]

Attest:

RUTH C. MASON
Attesting Officer

C. MARSHALL DANN
Commissioner of Patents and Trademarks